US011113385B2

(12) United States Patent
Dhavali et al.

(10) Patent No.: US 11,113,385 B2
(45) Date of Patent: Sep. 7, 2021

(54) COMMUNICATING TRACE INFORMATION BETWEEN SECURITY ZONES

(71) Applicant: PayPal, Inc., San Jose, CA (US)

(72) Inventors: Prajakta Dhavali, Fremont, CA (US); Binh Nguyen, San Jose, CA (US); Vladimir Bacvanski, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 118 days.

(21) Appl. No.: 16/230,953

(22) Filed: Dec. 21, 2018

(65) Prior Publication Data
US 2020/0201984 A1 Jun. 25, 2020

(51) Int. Cl.
*G06F 21/52* (2013.01)
*H04L 29/06* (2006.01)

(52) U.S. Cl.
CPC .............. *G06F 21/52* (2013.01); *H04L 63/20* (2013.01); *G06F 2221/033* (2013.01)

(58) Field of Classification Search
CPC ..... G06F 21/52; G06F 2221/033; H04L 63/20
See application file for complete search history.

(56) References Cited

U.S. PATENT DOCUMENTS

| 6,083,281 | A | 7/2000 | Diec et al. |
| 7,954,094 | B2 | 5/2011 | Cascaval et al. |
| 2003/0061550 | A1* | 3/2003 | Ng .................. G06F 11/3664 714/45 |
| 2003/0149765 | A1 | 8/2003 | Hubbard et al. |
| 2005/0232239 | A1* | 10/2005 | Ilnicki ................. H04L 43/10 370/352 |
| 2007/0081524 | A1* | 4/2007 | Franz ................. H04L 65/608 370/356 |
| 2009/0204823 | A1 | 8/2009 | Giordano et al. |
| 2009/0271553 | A1* | 10/2009 | Gang ................ G06F 11/3485 710/305 |

(Continued)

FOREIGN PATENT DOCUMENTS

| WO | 2011001304 | 1/2011 |
| WO | WO-2015128275 A1 * | 9/2015 ............. H04L 43/04 |

OTHER PUBLICATIONS

IP.com search query; Jun. 2, 2020 (Year: 2020).*

(Continued)

*Primary Examiner* — Samson B Lemma
*Assistant Examiner* — Blake I Narramore
(74) *Attorney, Agent, or Firm* — Kowert, Hood, Munyon, Rankin & Goetzel, P.C.

(57) ABSTRACT

An application runs in a first security zone of a computer system. Trace information generated from running the application is stored in a first security zone. Filtered trace information is generated by removing specified information from the trace information. The filtered trace information is stored in a particular storage location within the first security zone. An adapter application that is running within the first security zone is executable to access the particular storage location and call a second security zone. The adapter application transmits, from the first security zone to a datastore within the second security zone, the filtered trace information stored in the particular storage location. Communication between the first security zone and the second security zone is one-way from the first security zone to the second security zone.

19 Claims, 8 Drawing Sheets

(56) References Cited

U.S. PATENT DOCUMENTS

| | | | |
|---|---|---|---|
| 2011/0099550 A1* | 4/2011 | Shafi | G06F 11/3058 |
| | | | 718/102 |
| 2011/0252116 A1* | 10/2011 | Menoher | H04L 63/105 |
| | | | 709/217 |
| 2012/0254900 A1 | 10/2012 | Kumar et al. | |
| 2013/0219363 A1 | 8/2013 | Wu et al. | |
| 2014/0019598 A1 | 1/2014 | Krajec | |
| 2014/0019756 A1* | 1/2014 | Krajec | G06F 21/52 |
| | | | 713/167 |
| 2014/0019985 A1 | 1/2014 | Krajec | |
| 2014/0025572 A1 | 1/2014 | Krajec | |
| 2014/0047548 A1* | 2/2014 | Bye | G06F 21/604 |
| | | | 726/26 |
| 2014/0282430 A1* | 9/2014 | Kew | G06F 11/3636 |
| | | | 717/130 |
| 2015/0135254 A1* | 5/2015 | Thilenius | H04L 63/0227 |
| | | | 726/1 |
| 2015/0215283 A1* | 7/2015 | Fischer | H04L 63/029 |
| | | | 726/14 |
| 2015/0312253 A1* | 10/2015 | Barkan | G06F 21/53 |
| | | | 713/193 |
| 2016/0057073 A1* | 2/2016 | Steinder | H04L 47/72 |
| | | | 709/226 |
| 2016/0119202 A1* | 4/2016 | Iyer | G06F 11/0772 |
| | | | 714/37 |
| 2016/0140014 A1* | 5/2016 | Lampert | G06F 11/0781 |
| | | | 714/45 |
| 2016/0337348 A1* | 11/2016 | Teng | H04L 63/20 |
| 2017/0098094 A1* | 4/2017 | Winslow | H04L 63/12 |
| 2017/0171220 A1* | 6/2017 | Thomson | H04L 49/90 |
| 2018/0351914 A1* | 12/2018 | Jobson | H04L 63/105 |

OTHER PUBLICATIONS

IP.com search query; Nov. 25, 2020 (Year: 2020).*
International Search Report and Written Opinion in Appl. No. PCT/US2019/066826 dated Mar. 11, 2020, 10 pages.

* cited by examiner

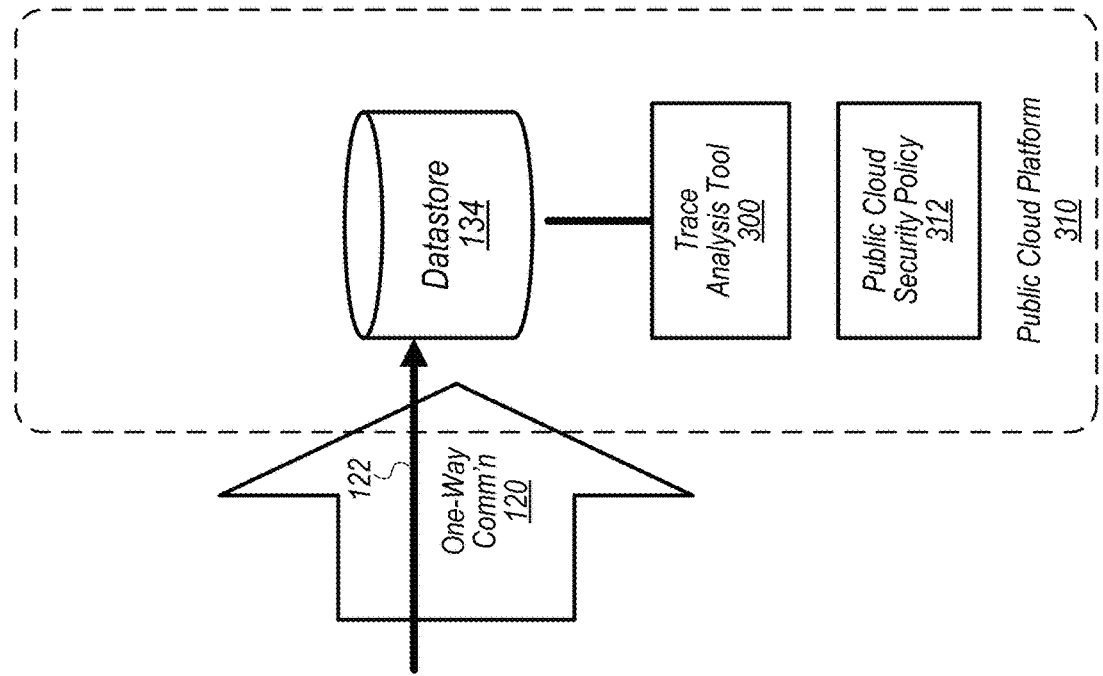
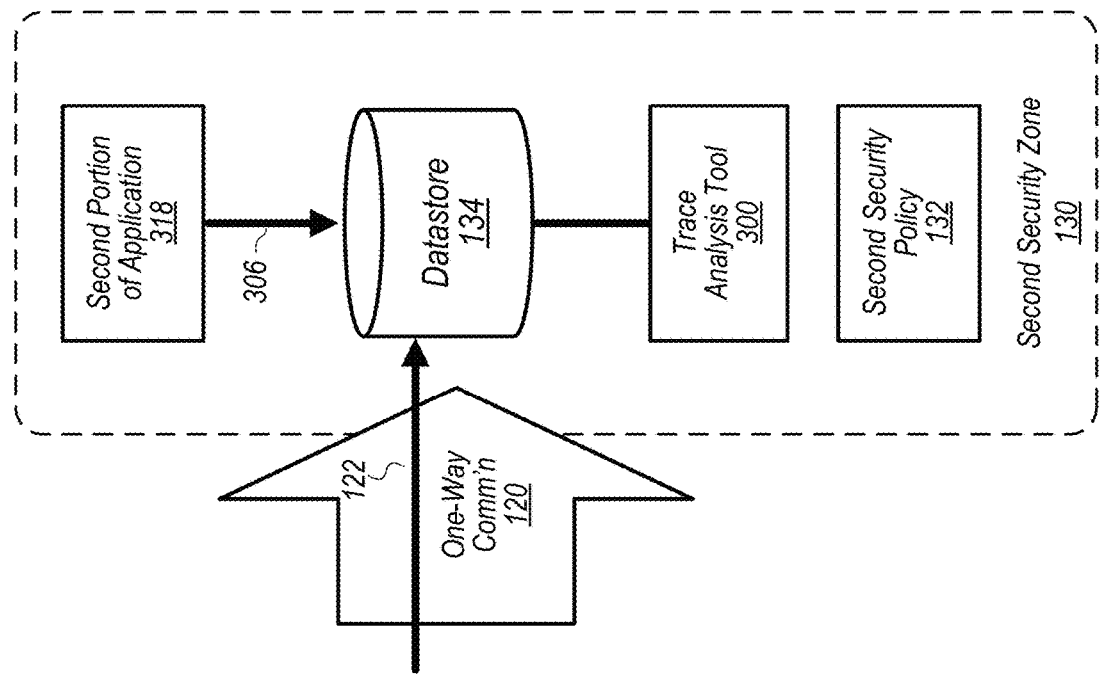
FIG. 3B
FIG. 3A

COMMUNICATING TRACE INFORMATION BETWEEN SECURITY ZONES

BACKGROUND

Technical Field

This disclosure relates generally to communication between different security zones.

Description of the Related Art

In order to identify bugs in software, user errors, or system failures associated with running software, many applications generate traces as they are executed that are usable to identify problems with the software. For these logs to be usable to address problems with the software, such traces must be recorded and be made accessible to tools that can interpret the traces such that problems can be diagnosed. Traces can include sensitive information, and traces might be sent to another computer system for analysis.

SUMMARY

The present disclosure concerns the transmission of information logged as a result of the execution of an application within a first computer system to an analysis tool running within a second computer system. An exemplary first security zone is controlled using a first security policy and implements a secure application that generates trace information while it executes, a filter to remove specified information from the generated trace information to generate filtered trace information that is stored in a filtered datastore, and an adapter application executable to access the filtered datastore and send the filtered trace information outside of the first security zone. A datastore implemented in a second security zone receives the filtered trace information and is accessible to a trace analysis tool implemented within the second security zone. The second security zone is controlled using a second security policy. Communication between the first security zone to the second security zone is one-way such that messages can be sent from the first security zone to the second security zone while complying with the first security policy and the second security policy.

BRIEF DESCRIPTION OF THE DRAWINGS

FIGS. 3A and 3B are expanded block diagrams of the second security zone of FIG. 1 in accordance with various embodiments.

Figure 1:
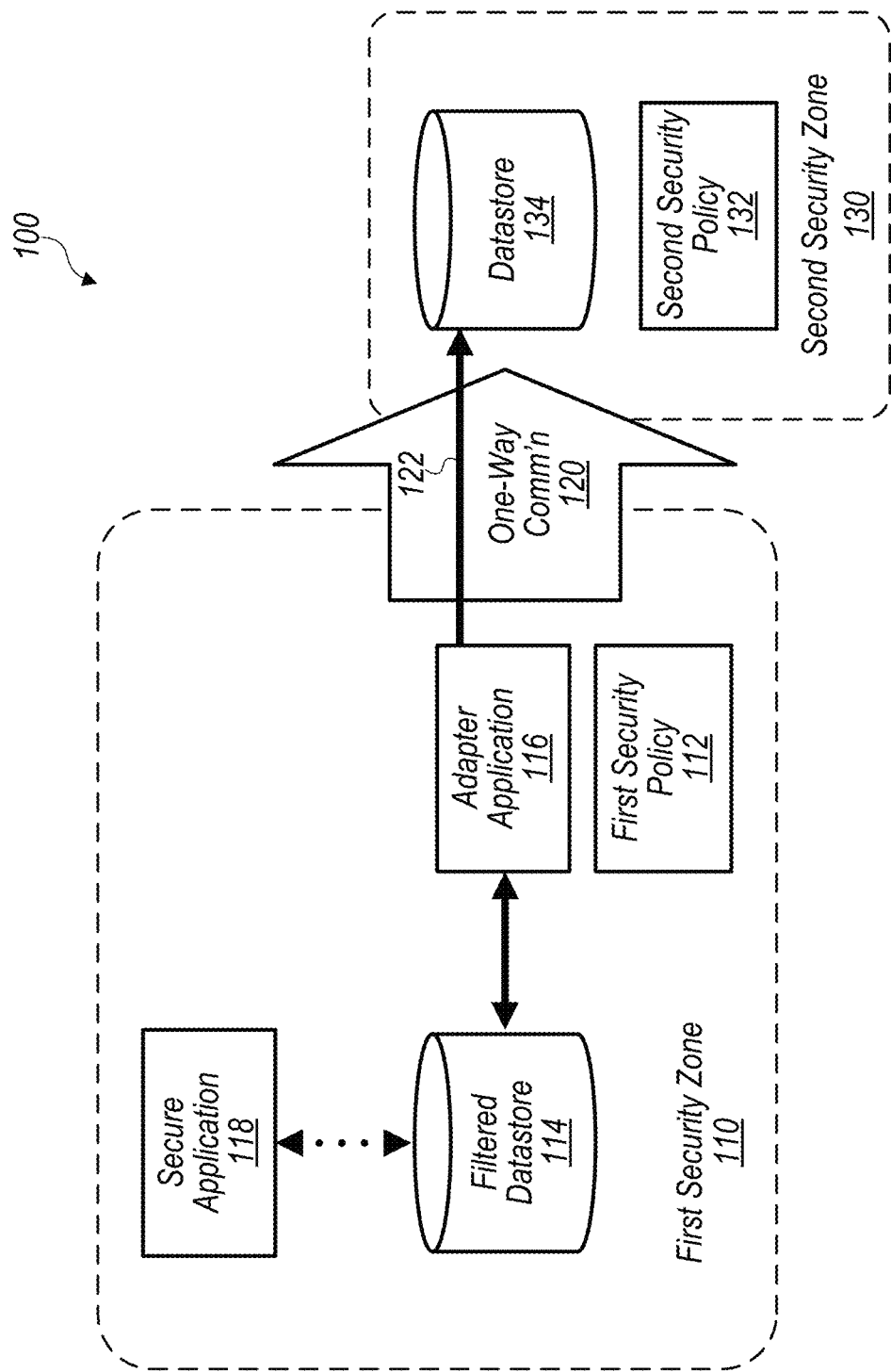
FIG. 1 is a block diagram illustrating an embodiment of a computer system including a first security zone and a second security zone.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to run an application" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" security zones would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram illustrates an exemplary embodiment of a computer system 100 including various components in a first security zone 110 and a second security zone 130 and communication between the various components. In various embodiments, the components of first security zone 110 and second security zone 130 shown in FIGS. 1, 2, 3A, and 3B are implemented as modules as defined herein. First security zone 110 is controlled by first security policy 112 and includes a filtered datastore 114 and implements adapter application 116 and secure application 118. Second security zone 130 is controlled by second security policy 132 and includes a datastore 134. As discussed herein, adapter application 116 is executable to access designated components of first security zone 110 (e.g., filtered datastore 114) and communicates with designated components of second security zone 130 (e.g., datastore 134) via one-way communication pathway 120 from first security zone 110 to second security zone 130.

First security zone 110 and second security zone 130 are two different security zones governed by respective security policies 112 and 132 As used herein, a "security zone" refers to a group of computing resources having interfaces to which a security policy (e.g., security policies 112, 132) can be applied to control traffic between zones. In various embodiments, security policies 112 and 132 impose restrictions on communications entering and/or leaving their respective security zones 110, 130. In various embodiments, a security zone includes one or more computer systems (e.g., one or more computer systems 800 discussed herein in reference to FIG. 8) configured to communicate with computer systems in other security zones according to the security zone's security policy. The various components within first security zone 110 are discussed in further detail in reference to FIG. 2, and the various components within second security zone 130 are discussed in further detail in reference to FIGS. 3A and 3B. In various embodiments, first security zone 110 includes one or more computer servers and computer memories configured to implement secure application 118, filter 204, filtered datastore 114, and an adapter application 116. Similarly, in various embodiments, second security zone 130 includes one or more computer servers and computer memories configured to implement datastore 132 and trace analysis tool 300. In such embodiments, the security policy 112 and/or security policy 132 controls traffic from first security zone 110 to second security zone 130 such that a one-way communication pathway 120 is implemented as discussed herein. As discussed in further detail in reference to FIGS. 3A and 3B, in some embodiments first security zone 110 is a high security zone (e.g., a dedicated computer system that is protected using a highly restrictive security policy 112 that prevents access to components within first security zone 110 from components outside first security zone 110) and second security zone 130 is a lower security zone (e.g., protected using a less restrictive security policy 132 that allows access to components within second security zone 130 from without).

Filtered datastore 114 in first security zone 110 is configured to store a plurality of filtered records (e.g., filtered trace information 206 discussed in connection to FIG. 2 herein) that were generated by application 118 and processed for transmission from first security zone 110 (e.g., filtered by filter 204). Datastore 134 in second security zone 130 is configured to store information (e.g., received in messages 122 sent by adapter application 116 (e.g., filtered trace information 206 discussed in connection to FIG. 2 herein). Filtered datastore 114 is discussed in further detail herein in connection to FIG. 2, and datastore 134 is discussed in further detail herein in connection to FIGS. 3A and 3B.

Adapter application 116 is executable to access a particular storage location within first security zone 110 (e.g., some or all of filtered datastore 114), access one or more records in the particular, and send the accessed records from first security zone 110 to datastore 134 in second security zone 130 in one or more messages 122. In connection with first security policy 112 (and/or second security policy 132), adapter application 116 is executable to establish one-way communication pathway 120 from first security zone 110 to second security zone 130. In various embodiments, first security policy 112 allows adapter application 116 to send messages 122 but first security policy 112 controls components within first security zone 110 to block communications from without (e.g., communications from components in second security zone 130, communications from components outside both first security zone 110 and second security zone 130). In various embodiments, first security policy 112 allows adapter application 116 to call components within second security zone 130 but does not allow components within second security zone 130 to call components within first security zone 110. In some embodiments, second security policy 132 allows messages 122 to proceed from first security zone 110 to second security zone 130, but prevents components within second security zone 130 to send messages to first security zone 110.

In various embodiments, adapter application 116 is executable to access, within first security zone 110, only the particular storage location (e.g., not secure application 118, not an unfiltered datastore in which unfiltered trace information 202 is stored, and not filter 204). In some embodiments, adapter application 116 is executable to access only portions of filtered datastore 114 (e.g., some memory locations within filtered datastore 114 but not others). In some embodiments, adapter application 116 is executable to transmit only to datastore 134 of the second security zone 130 (e.g. not to components outside second security zone 130, not to other components of second security zone 130).

In various embodiments, secure application 118 is an application executable using one or more computer systems within first security zone 110. In various embodiments, application 118 performs any function (e.g., accessing memory, data processing, etc.) within first security zone 110 using information stored within or received by first security zone 110. Moreover, in various embodiments secure application 118 generates information that is stored within security zone 110. In embodiments, some of such information accessed or generated by secure application 118 should not be removed from first security zone 110. For example, such information may be financial information (e.g., bank account numbers), health information (e.g., blood test results), personal contact information (e.g., user addresses) or any other type of specified information. As discussed in further detail in reference to FIG. 2, secure application 118 generates information (e.g., trace information 202) that is processed to remove information that should not leave first secure zone 110 (e.g., using filter 204) and stored in filtered datastore 114 (e.g., filtered trace information 206).

Accordingly, adapter application 116 enables access to certain records stored within first security zone 110 that would otherwise be unavailable for access outside of first security zone 110 because of security risks associated with allowing access to components within first security zone 110. In various embodiments, allowing such accesses would violate first security policy 112, but allowing adapter application 116 to access a particular storage location and send messages to a datastore 134 would not. In particular, the combination of first security policy 112, adapter application 116, and the fact that information in filtered datastore 114 is filtered (as discussed in further detail in connection to FIG. 2), enables secure, one-way transmission of messages 122—that do not contain specified information that should not be removed from first security zone 110—from first security zone 110 to second security zone 130. As discussed further in connection to FIGS. 3A, 3B, and 4-7, the information in such messages 122 contains information that is usable to monitor the execution of secure application 118 running within first security zone 110.

Figure 2:
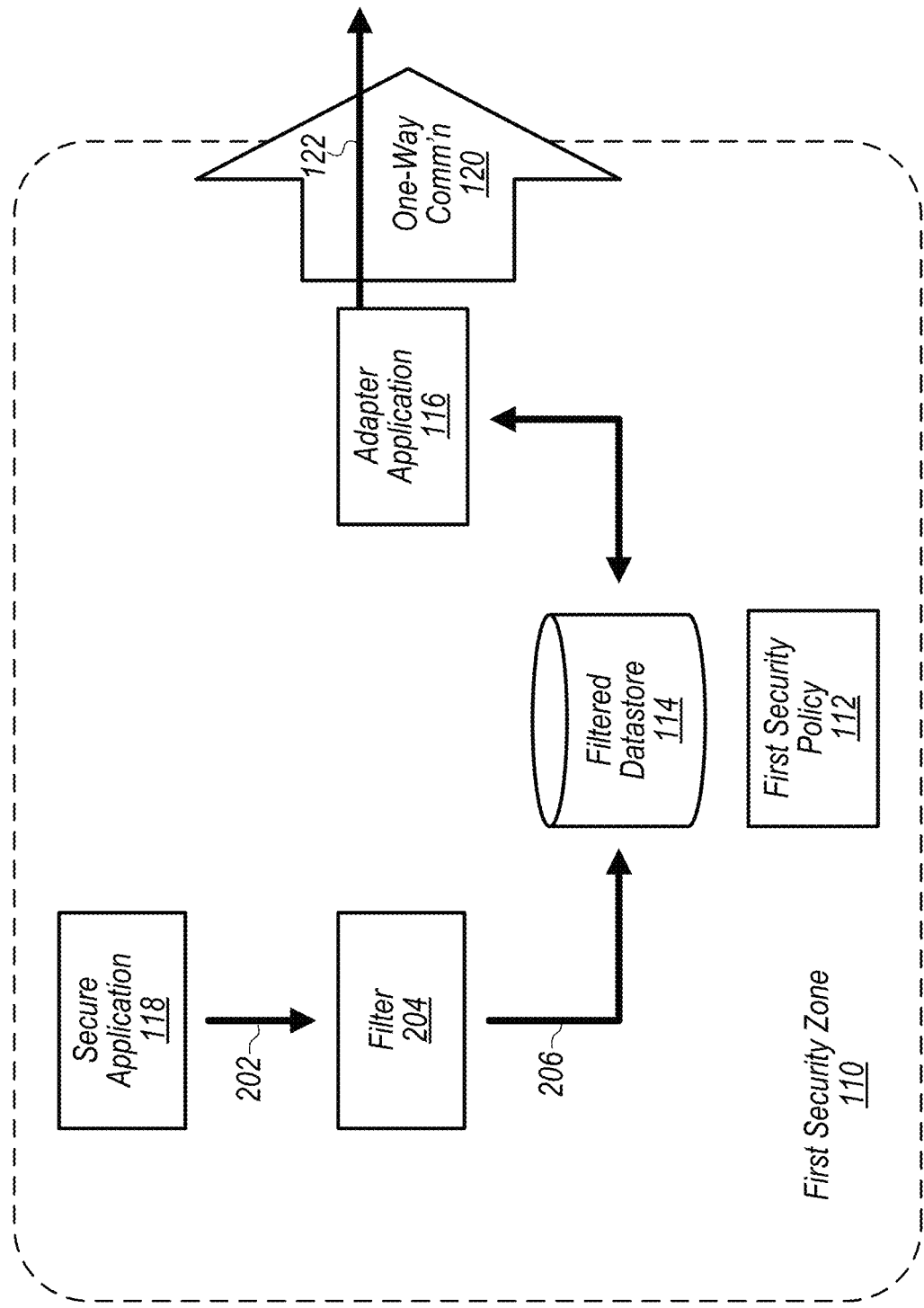
FIG. 2 is an expanded block diagram of the first security zone of FIG. 1 in accordance with various embodiments.

Referring now to FIG. 2, an expanded block diagram of the first security zone 110 of FIG. 1 is depicted in accordance with various embodiments. In addition to the first security policy 112, filtered datastore 114, adapter application 116, and secure application 118 discussed in connection to FIG. 1, FIG. 2 depicts additional detail of the information flow from secure application 118 to filtered datastore 114. In particular, FIG. 2 depicts that the information flow between secure application and filtered datastore 114 includes trace information 202, a filter 204, and filtered trace information 206. In some embodiments, first security zone 110 is implemented using a computer system secured using a first security policy 112 that prevents accesses to the first security zone 110 from outside first security zone 110 (e.g., computer systems that are not within first security zone 110). In some embodiments, for example, first security zone 110 is the production computer system on which secured applications 118 are implemented using codebases stored within first security zone 110, and because of a highly restrictive first security policy 112 that disallows all access attempts from outside first security zone 110, the performance of the secured application 118 can only be monitored by users of computer systems outside first security zone 110 using adapter application 116 discussed herein.

In order to monitor the functionality and/or reliability of secure application 118, secure application 118 produces trace information 202 as various functions of secure application 118 are executed. "Trace information" or individually "traces" refers to information that specifies information about an application's execution. Such traces are usable by trace analysis tools (e.g., trace analysis tool 300 discussed in reference to FIGS. 3A and 3B) to prepare reports about the performance of secure application 118. Such reports can be used, for example, by developers to debug the secure application 118 that generated the traces or by technical-support personnel to diagnose problems with secure application 118. In various instances, the developers of secure application 118 determine the type and amount of trace information 202 that secure application 118 should produce for debugging and diagnostics purposes and program secure application 118 accordingly. In various embodiments, such trace information 202 can be used to calculate the reliability of secure application 118 and provide insights on system failures, user errors, the performance of secure application 118, etc. Such trace information 202 may be used to educate users to avoid user errors, to identify system failures for resolution, etc. Thus, secure application 118 is executable to generate trace information 202 according to its programming. In some embodiments, for example, secure application 118 is a software development tool usable by developers to create applications that run within first security zone 110. In such embodiments, trace information 202 (and the subsequently generated filtered trace information 206) is indicative of one or more failures in the software development tool which prevented a developer from completing an interaction with the software development tool (e.g., a user error prevented the deployment of a new application).

Such trace information 202 is stored in computer memory (e.g., in an unfiltered trace store (not shown)). Because secure application 118 accesses or generates information that should not be removed from first security zone 110, however, such trace information 202 may contain specified information that should not be removed from first security zone 110. For example, a developer of secure application 118 may determine that secure application 118 should record memory accesses relating to personal contact information for debugging purposes, and some of all of the personal contact information itself may be recorded in the trace information 202. In order to protect this specified information, trace information 202 is filtered using filter 204.

Filter 204 is a module executable to remove specified information from trace information 204 and thereby generate filtered trace information 206. Filter 204 is executable to analyze trace information 202, identify specified information to that should not be removed from first security zone 110, and remove the specified information. In various embodiments, filter 204 is executable to identify specified information based on the context in which the information appears (e.g., by looking for credit card numbers in traces from an application 200 that processes payments, by looking for health information in an application 200 that accesses medical records, by looking at units of measurement associated with a number) and/or by the format of the specified information (e.g., a sixteen-digit number may be a credit card number, a series of C's, T's, A's, and G's may be a DNA sequence). In various embodiments, filter 204 is executable to remove the specified information by deleting it from filtered trace information 206, obfuscating it in the filtered trace information 206, encrypting it in filtered trace information 206, or replacing the specified information with dummy characters (e.g., by replacing a credit card number with sixteen X's) in filtered trace information 206. Filtered trace information 206 is stored in filtered datastore 114.

In some embodiments, adapter application 116 pulls individual records (e.g., individual filtered trace records) from the particular storage location (e.g., locations within filtered datastore 114) in message 122 upon the individual records being written to the particular storage location (e.g., as individual filtered trace records 206 are stored in filtered datastore 114). In such embodiments, a stream of messages 122 can provide up-to-date information about the function of secure application 118 in near real time, but without compromising the security of first security zone 110. In other embodiments, adapter application 116 regularly pulls batches of individual records (e.g., individual filtered trace records) from the particular storage location (e.g., locations within filtered datastore 114) and send the batches of individual records in message 122. As discussed above, in various embodiments, adapter application 116 is executable to only access, within first security zone 110, only the particular storage location (e.g., locations within filtered datastore 114).

Referring now to FIGS. 3A and 3B, expanded block diagrams of the second security zone 130 of FIG. 1 are depicted in accordance with various embodiments. Second security zone 130 is controlled according to second security policy 132 and implements datastore 132 and trace analysis tool 300. In various embodiments, datastore 134 and trace analysis tool 300 are implemented using different hardware (e.g., different computer servers), but in other embodiments are implemented on the same hardware. As discussed herein, second security zone 130 is configured to receive messages 122 via one-way communication pathway 120 from first security zone 110 according to security policies 112 and/or 132. In various embodiments, messages 122 include filtered trace information 206 that is received by datastore 134 and stored for analysis.

Referring now to FIG. 3A, in various embodiments, secure application 118 is executable with a hybrid run-time profile such that a first portion of the applications 118 runs in first security zone 110 and a second portion 318 runs in second security zone 130. In such embodiments, for example, certain portions of secure application 118 relating to the specified information (e.g., processing credit card transactions) are implemented in first security zone 110 but other portions (e.g., providing a customer-facing user interface) are performed by second portion 318 implemented in second security zone 110. Such hybrid applications can be implemented using any number of portions, on any number of computer systems, in any number of security zones (e.g., not just two portions implemented in two security zones). In addition to trace information generated by secure application 118, second portion 318 also generates trace information 306 in various embodiments. Such trace information 306 is received at datastore 134 for analysis.

Referring now to FIG. 3B, in various embodiments, second security zone 130 comprises a public cloud platform 310 (e.g., the Google® Cloud Platform, Amazon® Web Services) controlled according to a public cloud security policy 312. In such embodiments, trace analysis tool 300 and datastore 134 are implemented using public cloud platform 310. In some of such embodiments, first security zone 110, in contrast, is a dedicated computer system associated with the developers or implementers of secured application 118 (e.g., an on-site server or servers). While FIG. 3B does not include second portion 318, it will be understood that the hybrid run-time profile discussed herein can be implemented by executing second portion 318 on public cloud platform 310.

In various embodiments, trace analysis tool 300 is any of a number of tools implemented in second security zone that is executable to ingest and organize trace information to aid users in identifying bugs, system failures, etc. As discussed above, filtered trace information 206 is generated by secure application 118 as secure application 118 executes. Additionally, in embodiments, trace information 306 is generated by second portion 318 as second portion 318 executes. In various instances, the resulting filtered trace information 206 and/or 306 is not structured. In various embodiments, trace analysis tool 300 is executable to identify tasks performed by the different hardware and to identify the location of a system failure in first security zone 110 and/or second security zone 130. In embodiments in which first security zone 110 implements various cloud services in a stack, trace analysis tool 300 is executable to identify the portions of the stack are associated with bugs, system failures, etc. Further, in embodiments where secure application 118 and second portion 318 complement each other to implement an application, trace analysis tool 300 is executable to identify which of secure application 118 or second portion 318 is associated with a particular failure. In various embodiments, trace analysis tool 300 is a third-party tool implemented on public cloud platform 310. Various aspects of exemplary trace analysis reports are discussed herein in connection to FIGS. 5, 6, and 7.

Figure 4:
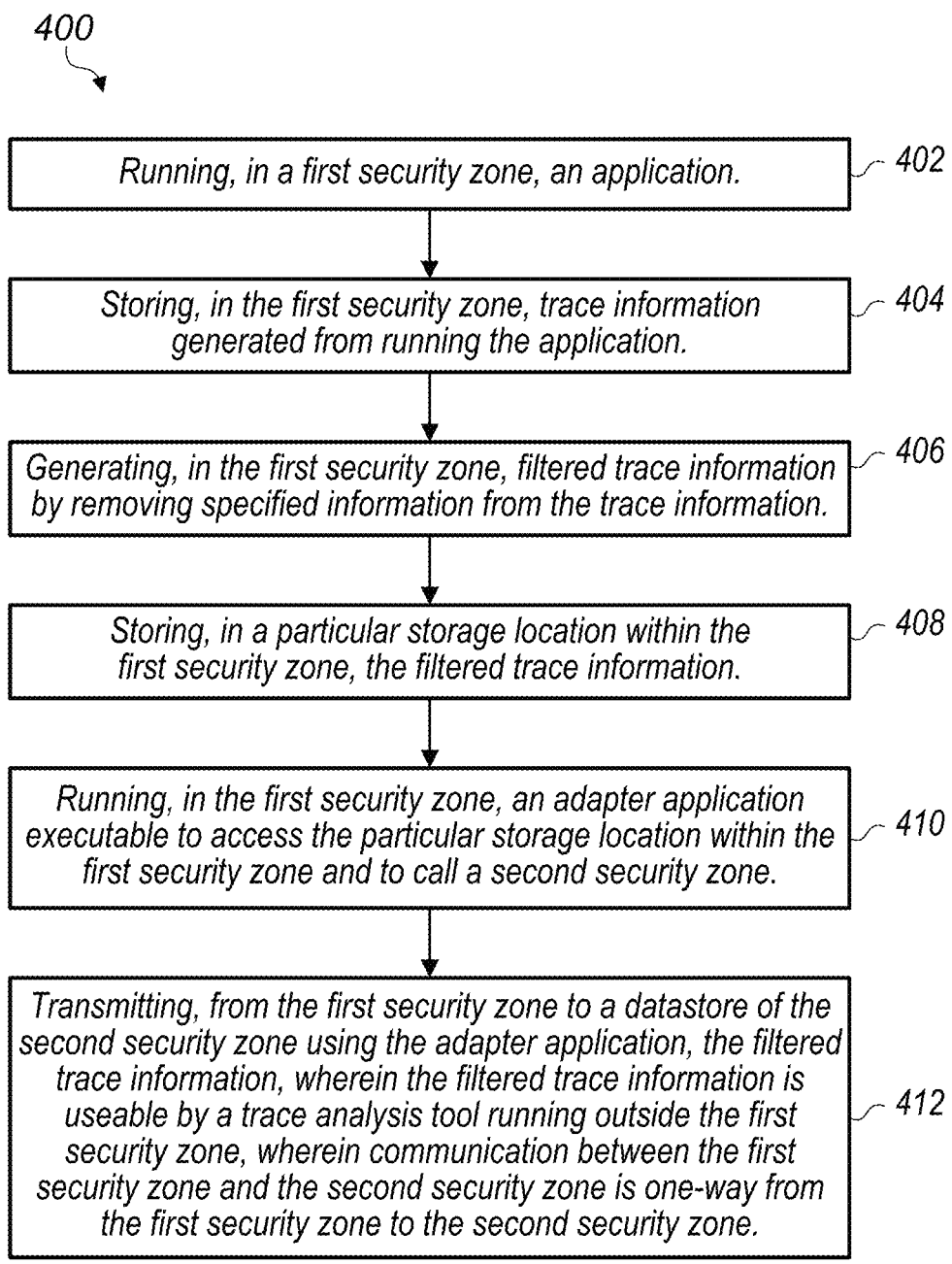
FIG. 4 is a flowchart illustrating an embodiment of a trace information transmission method in accordance with the disclosed embodiments.

Referring now to FIG. 4, a flowchart illustrating a trace information transmission method 400 is shown. In various embodiments, the various actions associated with method 400 are performed by components within first security zone 110. At block 402, components in first security zone 110 run an application (e.g., secure application 118). At block 404, components in first security zone 110 store trace information 202 generated from running application 118. At block 406, components in first security zone 110 (e.g., filter 204) generates filtered trace information 206 by removing specified information from trace information 202. At block 408, components in first security zone 110 store, in a particular storage location (e.g., filtered datastore 114) within first security zone 110, the filtered trace information 206. At block 410, components in first security zone 110 run adapter application 116 that is executable to access the particular storage location within first security zone 110 and to call second security zone 130. At block 412, components in first security zone 110 transmit filtered trace information 206 from first security zone 110 to datastore 134 of second security zone 130 using adapter application 116. As discussed herein, filtered trace information 206 is usable by trace analysis tool (e.g., trace analysis tool 300) running outside first security zone 110 (e.g., running in second security zone 130). Communication between first security zone 110 and the second security zone 130 is one-way from first security zone 110 to second security zone 130.

Figure 5:
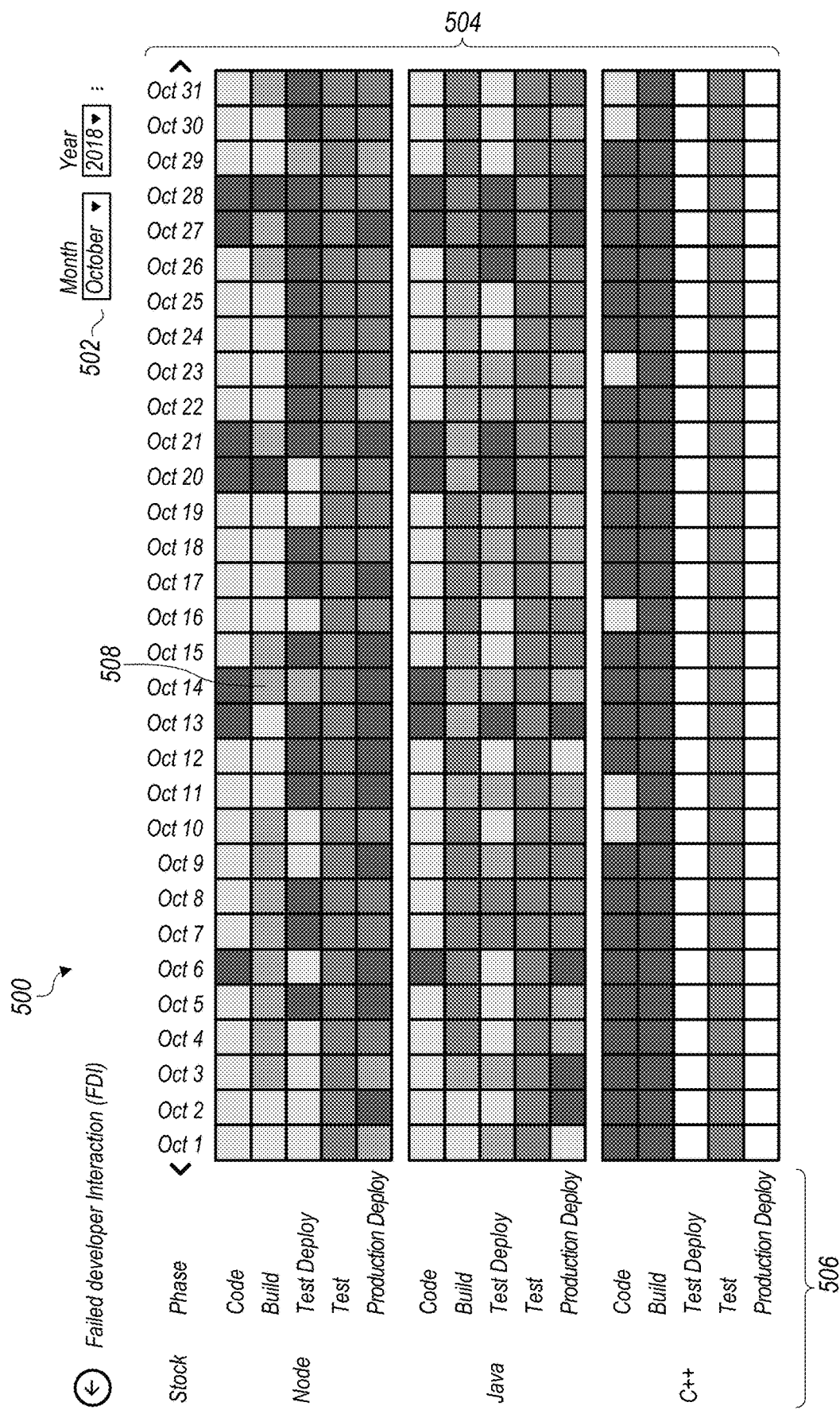
FIGS. 5-7 are exemplary trace analysis reports generated in accordance with various embodiments.
Figure 6:
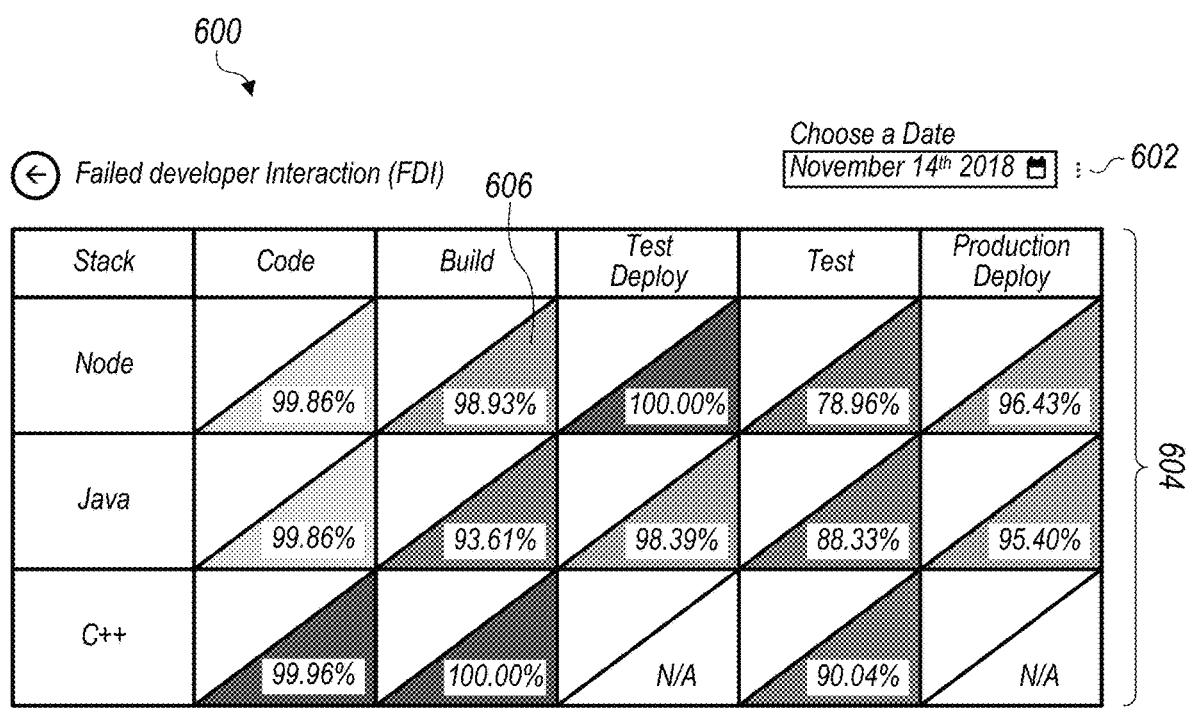
Figure 7:
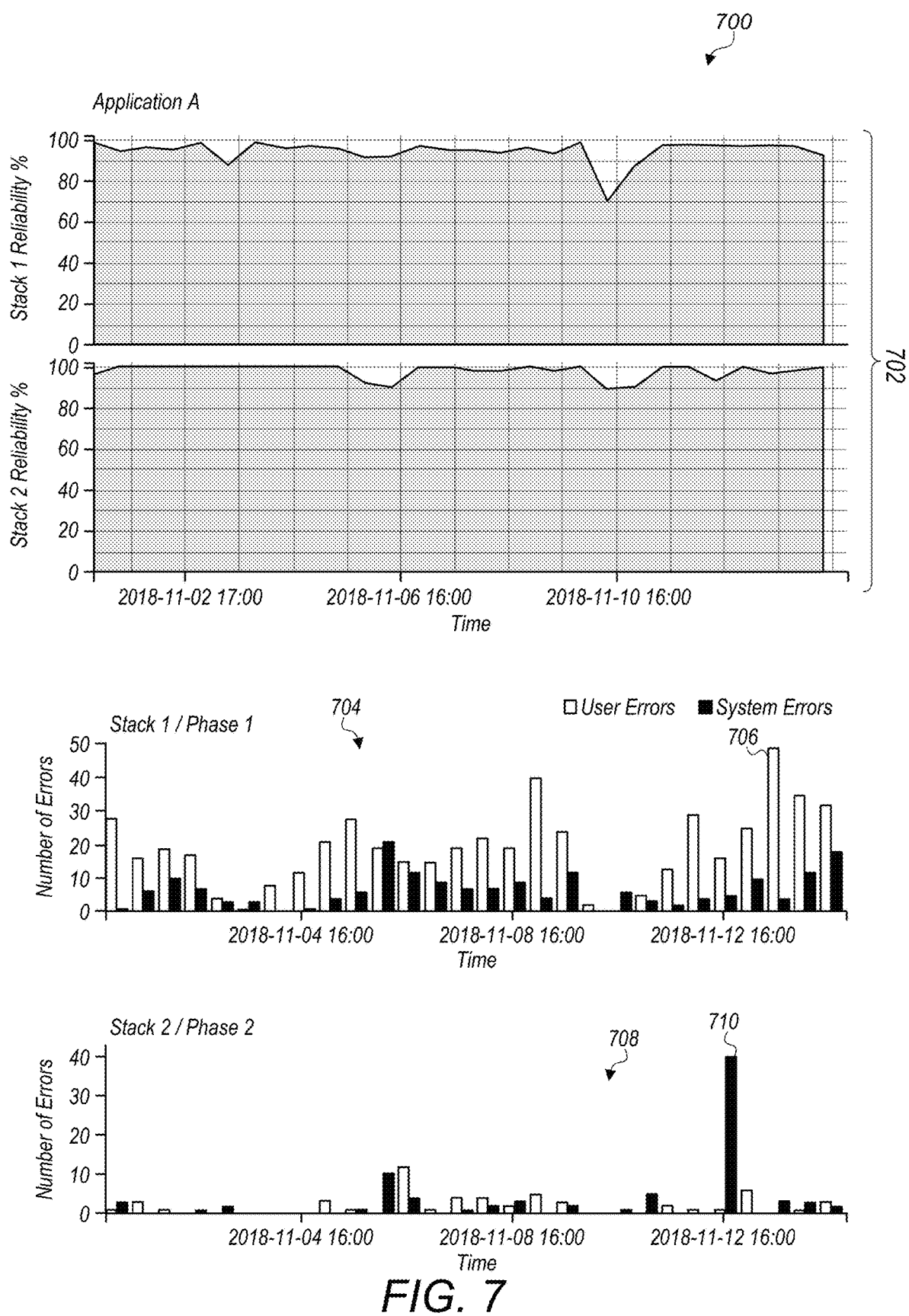

Referring now to FIGS. 5, 6, and 7, various trace analysis reports 500, 600, 700 are depicted. FIG. 5 depicts a monthly trace analysis report 500. FIG. 6 depicts a daily trace analysis report 600. FIG. 7 depicts an hourly trace analysis report 700. The trace analysis reports 500, 600, 700 depict exemplary analyses of "failed developer interactions" ("FDI") that are generated by a secure application 118 that a software development tool usable by developers to create applications that run within first security zone 110. Such FDIs, for example, represent instances where a user interaction with the software development tool was not completed (e.g., a tool created by a user failed to deploy). Thus, in various embodiments an FDI comprises one or more individual traces generated by the software development tool. As discussed herein, FDIs are attributable to various stacks within a cloud computing platform, are attributable to secure application 118 running within first security zone 110 or second portion 318 running within second security zone 130, and are attributable to user errors or system failures.

The various reports 500, 600, 700 are prepared using trace analyses performed by a trace analysis tool (e.g., trace analysis tool 300) running outside first security zone 110. In various embodiments, the trace analysis tool 300 prepares the report based on its trace analysis, but in other embodiments the report is generated by a separate computer system (e.g., a user device being used by a developer) after receiving the trace analysis of the filtered trace information 206. As discussed herein, in various instances, the trace analysis received from trace analysis tool 300 includes analysis of trace information 306 generated by second portion 318. As discussed herein, the reports 500, 600, 700 are indicative of the performance and reliability of the secure application 118 and/or second portion 318, and are usable by users (e.g., developers) to debug problems, identify system failures, identify user errors, etc.

Referring now to FIG. 5, a monthly trace analysis report 500 is depicted. A date 502 indicates the period of time (e.g., October 2018 in FIG. 5) for report 500. Grid 504 includes a series of icons 508 (e.g., boxes, but any other shapes could be used) arranged by date on the x-axis and by stack and phase on the y-axis. As shown in FIG. 5, the various icons 508 in grid 504 are color coded to indicate reliability (e.g., some icons are green indicating a high level of reliability, some icons are red indicating a low level of reliability). Labels 506 indicate which stack and which phase of which stack correspond to the various rows of grid 504. Thus, the code phase of the node stack corresponds to the icons 508 in the first row, the production deploy phase of the Java stack corresponds to the icons in the tenth row, etc. Any number of stacks and phases of the stacks may be included in report 500. Moreover, each stack and phase of the stacks may be associated with the same or different hardware. Further, all of the stacks and phases of the stacks may be implemented within first security zone 110, but in other embodiments some stacks and/or some phases of some stacks are implemented within second security zone 130. Thus, a user reviewing report 500 would have an indication of the reliability on a particular month of various stacks and phases of stacks associated with secure application 118 and/or second portion 318.

Referring now to FIG. 6, a daily trace analysis report 600 is depicted. A date 602 indicates the period of time (e.g., Nov. 14, 2018) for report 600. Grid 604 includes a series of icons 606 (e.g., boxes with inscribed triangles) arranged by stack on the y-axis and phase on the x-axis. As shown in FIG. 6, the various icons 606 are color coded to indicate reliability (e.g., some icons are green indicating a high level of reliability, some icons are red indicating a low level of reliability) and additionally have numerical indications of reliability. Any number of stacks and phases of the stacks may be included in report 600. Moreover, each stack and phase of the stacks may be associated with the same or different hardware. Further, all of the stacks and phases of the stacks may be implemented within first security zone 110, but in other embodiments some stacks and/or some phases of some stacks are implemented within second security zone 130. Thus, a user reviewing report 600 would have an indication of the reliability on a particular day of various stacks and phases of stacks associated with secure application 118 and/or second portion 318.

Referring now to FIG. 7, an hourly trace analysis report 700 is depicted. Portion 702 includes two graphs charting the reliability of two stacks over the course of a few hours. Graphs 704 and 708 are bar graphs indicating the reliability of particular phase: phase 1 of stack 1 and phase 2 of stack 2, respectively. The various bars in graphs 704 and 708 are indicative of counts of FDIs attributable to user errors and system errors. Thus, bar 706 is indicative of a relative highly high number of user error in phase 1 of stack 1 at a particular time, and bar 710 is indicative a relatively high number of system errors at another particular time. Any number of stacks and phases of the stacks may be included in report 700. Moreover, each stack and phase of the stacks may be associated with the same or different hardware. Further, all of the stacks and phases of the stacks may be implemented within first security zone 110, but in other embodiments some stacks and/or some phases of some stacks are implemented within second security zone 130. Thus, a user reviewing report 700 would have an indication of the reliability over the course of a few hours of various stacks and phases of stacks associated with secure application 118 and/or second portion 318.

Exemplary Computer System

Figure 8:
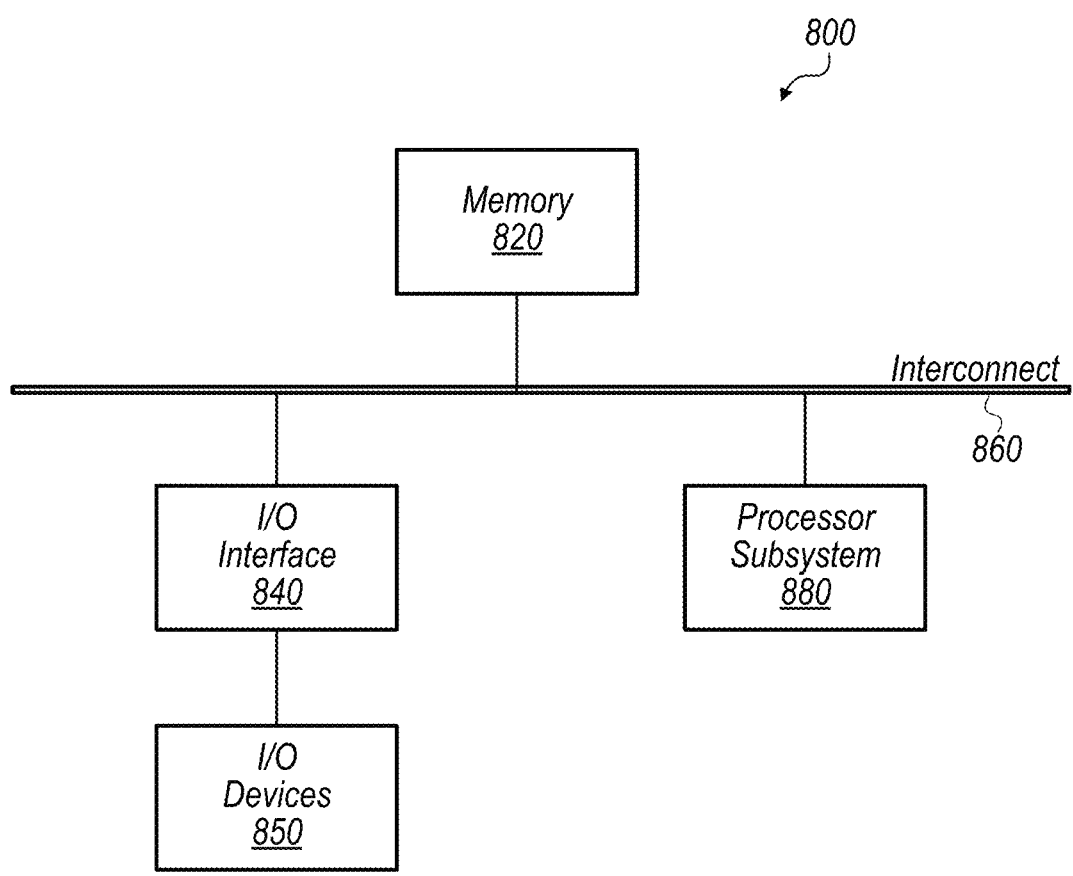
FIG. 8 is a block diagram of an exemplary computer system, which may implement the various components of FIGS. 1, 2, 3A, and 3B.

Turning now to FIG. 8, a block diagram of an exemplary computer system 800, which may implement the various components of computer system 100 (e.g., components within first security zone 110, components within second security zone 130) is depicted. Computer system 800 includes a processor subsystem 860 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 860 may include one or more processors or processing units. In various embodiments of computer system 800, multiple instances of processor subsystem 860 may be coupled to interconnect 860. In various embodiments, processor subsystem 860 (or each processor unit within 860) may contain a cache or other form of on-board memory.

System memory 820 is usable to store program instructions executable by processor subsystem 860 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 860 and secondary storage on I/O Devices 850 (e.g., a hard drive, storage array, etc.). In some embodiments, these other forms of storage may also store program instructions executable by processor subsystem 860.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   running, in a first security zone of a computer system, a first portion of an application, wherein a second portion of the application runs in a second security zone, wherein the first security zone is a secure zone of the computer system and the second security zone is a public cloud computing platform;
   storing, in the first security zone, trace information generated from running the first portion of the application;
   generating, in the first security zone, filtered trace information by removing specified information from the trace information, wherein the specified information is a subset of information in the trace information that is identified for filtering prior to the trace information being generated;
   storing, in a particular storage location within the first security zone, the filtered trace information;
   running, in the first security zone, an adapter application executable to access the particular storage location within the first security zone and to call a second security zone, wherein second trace information is generated from running the second portion of the application and is stored in a datastore of the second security zone;
   transmitting, from the first security zone to the datastore of the second security zone using the adapter application, the filtered trace information, wherein the filtered trace information and second trace information are useable by a trace analysis tool running outside the first security zone;
   wherein communication between the first security zone and the second security zone is one-way from the first security zone to the second security zone;
   receiving, from the trace analysis tool, a trace analysis of the filtered trace information and the second trace information; and
   based on the trace analysis, generating a trace analysis report for the application indicative of a reliability of the first portion of the application and the second portion of the application.

2. The method of claim 1, wherein the trace analysis tool is running on the public cloud, and the datastore of the second security zone is accessible by the trace analysis tool running on the public cloud.

3. The method of claim 1,
   wherein the trace information comprises a plurality of individual traces;
   wherein the filtered trace information comprises a plurality of individual filtered traces; and
   wherein transmitting the filtered trace information includes transmitting the individual filtered traces upon each individual filtered trace being stored in the particular storage location.

4. The method of claim 1,
   wherein the trace information comprises a plurality of individual traces;
   wherein the filtered trace information comprises a plurality of individual filtered traces; and
   wherein transmitting the filtered trace information includes regularly transmitting batches of individual filtered traces.

5. The method of claim 1, wherein the adapter application is executable to access, within the first security zone, only the particular storage location.

6. The method of claim 1, wherein the adapter application is executable to transmit only to the datastore of the second security zone.

7. The method of claim 1, further comprising receiving, from the trace analysis tool at a location outside of the first security zone, a trace analysis report useable by a user to monitor the performance of the application running within the first security zone.

8. The method of claim 1, wherein the application is a software development tool, and the trace information and filtered trace information are indicative of one or more failures in the software development tool which prevented a developer from completing an interaction with the software development tool.

9. The method of claim 1,
   wherein communication between the first security zone and the second security zone is governed according to a security policy of the first security zone;
   wherein an access to the particular storage location by components in the second security zone would violate the security policy; and
   wherein an access to the particular storage location by the adapter application is permitted under the security policy.

10. A non-transitory, computer-readable medium storing instructions that when executed by a computer system cause the computer system to perform operations comprising:
   running, in a first security zone of the computer system, a first portion of an application, wherein a second, complementary portion of the application executes in a second security zone, wherein the first security zone is a secure zone of the computer system and the second security zone is a public cloud computing platform;
   storing, in the first security zone, trace information generated from running the first portion of the application;
   generating, in the first security zone, filtered trace information by removing specified information from the trace information, wherein the specified information is a subset of information in the trace information that is identified for filtering prior to the trace information being generated;
   storing, in a particular storage location within the first security zone, the filtered trace information;
   running, in the first security zone, an adapter application executable to access the particular storage location within the first security zone and to call a second security zone, wherein second trace information is generated from running the second portion of the application and is stored in a datastore of the second security zone;
   transmitting, from the first security zone to the datastore of the second security zone using the adapter application, the filtered trace information, wherein the filtered trace information and second trace information are useable by a trace analysis tool running outside the first security zone;

blocking any messages sent from the second security zone to the first security zone;

receiving, from the trace analysis tool, a trace analysis of the filtered trace information and the second trace information; and based on the trace analysis, generating a trace analysis report for the application indicative of a reliability of the first portion of the application and the second portion of the application.

11. The computer-readable medium of claim 10, wherein the adapter application is executable to access, within the first security zone, only the particular storage location.

12. The computer-readable medium of claim 10, wherein the adapter application is executable to transmit only to the datastore of the second security zone.

13. The computer-readable medium of claim 10,
wherein the trace information comprises a plurality of individual traces;
wherein the filtered trace information comprises a plurality of individual filtered traces; and
wherein transmitting the filtered trace information includes transmitting the individual filtered traces upon each individual filtered trace being stored in the particular storage location.

14. The computer-readable medium of claim 10,
wherein the trace information comprises a plurality of individual traces;
wherein the filtered trace information comprises a plurality of individual filtered traces; and
wherein transmitting the filtered trace information includes regularly transmitting batches of individual filtered traces.

15. The computer-readable medium of claim 10, wherein the application is a software development tool, and the trace information and filtered trace information are indicative of one or more failures in the software development tool which prevented a developer from completing an interaction with the software development tool.

16. The computer-readable medium of claim 10,
wherein communication between the first security zone and the second security zone is governed according to a security policy of the first security zone;
wherein an access to the particular storage location by components in the second security zone would violate the security policy; and
wherein an access to the particular storage location by the adapter application is permitted under the security policy.

17. A computer system comprising:
a computer memory disposed within a first security zone;
a network interface disposed within a first security zone and configured to send information to a second computer system in a second security zone, wherein the first security zone is a secure zone of the computer system and the second security zone is a public cloud computing platform, wherein the network interface is configured to block messages from the second security zone; and a processor circuit disposed within the first security zone, the processor circuit configured to:
run a first portion of an application within the first security zone wherein a second, complementary portion of the application executes in the second security zone;
collect trace information generated from running the first portion of the application;
generate filtered trace information generated by removing specified information from the trace information, wherein the specified information is a subset of information in the trace information that is identified for filtering prior to the trace information being generated;
storing the filtered trace information on the computer memory disposed within the first security zone;
run an adapter application executable to access the computer memory and call the second security zone, wherein second trace information is generated from executing the second portion of the application;
transmit, from the first security zone to a datastore of the second security zone using the adapter application, the filtered trace information;
receive, from a trace analysis tool, a trace analysis of the filtered trace information and the second trace information; and
based on the trace analysis, generate a trace analysis report for the application indicative of a reliability of the first portion of the application and the second portion of the application.

18. The computer system of claim 17,
wherein the trace information comprises a plurality of individual traces;
wherein the filtered trace information comprises a plurality of individual filtered traces; and
wherein transmitting the filtered trace information includes transmitting the individual filtered traces upon each individual filtered trace being stored in the computer memory.

19. The computer system of claim 17,
wherein communication between the first security zone and the second security zone is governed according to a security policy of the first security zone;
wherein an access to the computer memory by components in the second security zone would violate the security policy; and
wherein an access to the computer memory by the adapter application is permitted under the security policy.

* * * * *